United States Patent [19]

Copp et al.

[11] Patent Number: 5,857,150
[45] Date of Patent: Jan. 5, 1999

[54] RF RECEIVER RANGE EXTENDER

[75] Inventors: David Arlan Copp, Sharpsville;
Quentin Earl Langton Gurney,
Kokomo, both of Ind.

[73] Assignee: Delco Electronics Corp., Kokomo, Ind.

[21] Appl. No.: 719,142

[22] Filed: Sep. 24, 1996

[51] Int. Cl.[6] .................................................. H04B 1/06
[52] U.S. Cl. .................... 455/345; 455/41; 343/700 MS
[58] Field of Search .............................. 455/39, 345, 272, 455/41, 523; 343/700 MS, 702, 856, 715, 713

[56] References Cited

U.S. PATENT DOCUMENTS

| | | | |
|---|---|---|---|
| 4,092,646 | 5/1978 | Newington | 343/749 |
| 4,866,453 | 9/1989 | Nagy et al. | 343/712 |
| 4,875,051 | 10/1989 | Blaese | 343/715 |
| 4,941,207 | 7/1990 | Maeda et al. | 455/300 |
| 5,027,128 | 6/1991 | Blaese | 343/711 |
| 5,030,963 | 7/1991 | Tadama | 343/702 |
| 5,161,255 | 11/1992 | Tsuchiya | 455/345 |
| 5,262,791 | 11/1993 | Tsuda et al. | 343/700 MS |
| 5,627,529 | 5/1997 | Duckworth et al. | 340/825.72 |
| 5,648,787 | 7/1997 | Ogot et al. | 343/826 |

FOREIGN PATENT DOCUMENTS

| | | | |
|---|---|---|---|
| 0077512 | 6/1977 | Japan | 455/41 |
| 002247379 | 2/1992 | United Kingdom | 455/40 |

Primary Examiner—Reinhard J. Eisenzopf
Assistant Examiner—Edan Orgad
Attorney, Agent, or Firm—Jimmy L. Funke

[57] ABSTRACT

In a preferred embodiment, an apparatus for extending the receiving range of an RF receiver mounted in a non-metallic housing, including: at least one metallic strip attached to an element of the non-metallic housing; and the metallic strip being disposed so as to receive an RF signal transmitted to the RF receiver and air couple the RF signal into the RF receiver.

7 Claims, 5 Drawing Sheets

| Receiver Sensitivity Transmitter Power | Figure 5 | | Figure 4 | | Figure 3 | |
|---|---|---|---|---|---|---|
| | -85 dBm | | -85 dBm | | -85 dBm | |
| | 500μV/M @ 3 Meters | | 8000μV/M @ 3 Meters | | 8000μV/M @ 3 Meters | |
| Radial | No Tape | With Tape | No Tape | With Tape | No Tape | With Tape |
| 0 | 1 | 1 | 1 | 14 | 1 | 2 |
| 15 | 1 | 1 | 3 | 7 | 1 | 2 |
| 30 | 1 | 1 | 2 | 8 | 1 | 9 |
| 45 | 1 | 1 | 3 | 13 | 2 | 12 |
| 60 | 1 | 2 | 11 | 13 | 1 | 9 |
| 75 | 1 | 2 | 15 | 10 | 3 | 9 |
| 90 | 4 | 2 | 11 | 11 | 12 | 8 |
| 105 | 3 | 3 | 14 | 20 | 8 | 17 |
| 120 | 2 | 6 | 17 | 20 | 8 | 16 |
| 135 | 1 | 4 | 12 | 17 | 5 | 15 |
| 150 | 4 | 2 | 14 | 19 | 11 | 13 |
| 165 | 2 | 2 | 4 | 7 | 9 | 8 |
| 180 | 2 | 3 | 3 | 12 | 3 | 6 |
| 195 | 4 | 5 | 14 | 15 | 6 | 6 |
| 210 | 4 | 4 | 15 | 18 | 9 | 12 |
| 225 | 2 | 5 | 13 | 12 | 6 | 9 |
| 240 | 3 | 6 | 9 | 20 | 10 | 15 |
| 255 | 2 | 5 | 10 | 13 | 10 | 9 |
| 270 | 3 | 3 | 16 | 17 | 5 | 11 |
| 285 | 1 | 6 | 14 | 17 | 9 | 13 |
| 300 | 1 | 8 | 11 | 23 | 9 | 16 |
| 315 | 1 | 5 | 12 | 23 | 7 | 11 |
| 330 | 1 | 4 | 11 | 17 | 6 | 10 |
| 345 | 1 | 1 | 10 | 14 | 4 | 7 |
| Average | 1.96 | 3.42 | 10.21 | 15.00 | 6.08 | 10.21 |
| Change | | 1.46 | | 4.79 | | 4.13 |
| % Change | | 74.5% | | 46.9% | | 67.8% |

FIG. 6

RF RECEIVER RANGE EXTENDER

BACKGROUND OF THE INVENTION

1. Field of the Invention.

The present invention relates to RF receivers generally and, more particularly, but not by way of limitation, to novel means for extending the range of RF receivers.

2. Background Art.

While the present invention is described as applied to remote keyless entry RF receivers for vehicles, it will be understood that it is applicable, as well, to extending the receiving range of any RF receiver.

RF control devices used to lock/unlock vehicle doors and other similar types of RF control devices are beginning to be used extensively on vehicles. A problem being experienced with such devices is poor range, due to the power restrictions established by the Federal Communications Commission (FCC) on these low-range RF control devices. This restriction greatly limits the range to approximately 10 meters from the vehicle. Since the power is so low, the devices are constantly operating in the fringe area of their operating range. Therefore, any technique that can be used to extend the range of these devices without increasing the transmitted radiated signal would be desirable.

To increase the range of RF control devices, one could increase the transmitted radiated signal from the transmitter. This, as noted above, is limited by the FCC and most units are already designed to transmit the maximum allowable signal. Likewise, an improvement in receiver sensitivity may improve range, but such improvement may be very costly. In addition, receiver designs using today's technology are already designed to be close to the theoretical maximum sensitivity level. Another technique is to improve the receiving antenna design in some way to capture more of the available signal. However, using an external antenna on the receiver to pick up more of the transmitted signal may not be practical in some cases because of cost, space, or mechanical limitations.

Accordingly, it is a principal object of the present invention to provide an RF receiver range extender that avoids the use of an external antenna.

It is a further object of the invention to provide such range extender that does not require modification to the RF receiver.

It is an additional object of the invention to provide such range extender that is simple and economical.

It is another object of the invention to provide such range extender that can be retrofitted to existing RF receiver installations.

A further object of the invention is to provide such range extender that does not require FCC approval.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an apparatus for extending the receiving range of an RF receiver mounted in a non-metallic housing, comprising: at least one metallic strip attached to an element of said non-metallic housing; and said metallic strip being disposed so as to receive an RF signal transmitted to said RF receiver and air couple said RF signal into said RF receiver.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIG. 6 is a table presenting receiver sensitivity and transmitter power used in the measurements presented on FIGS. 3–5, as well as the numerical data obtained therefrom.

DETAILED DESCRIPTION OF THE PREFERRED EMBODIMENTS

Figure 1:
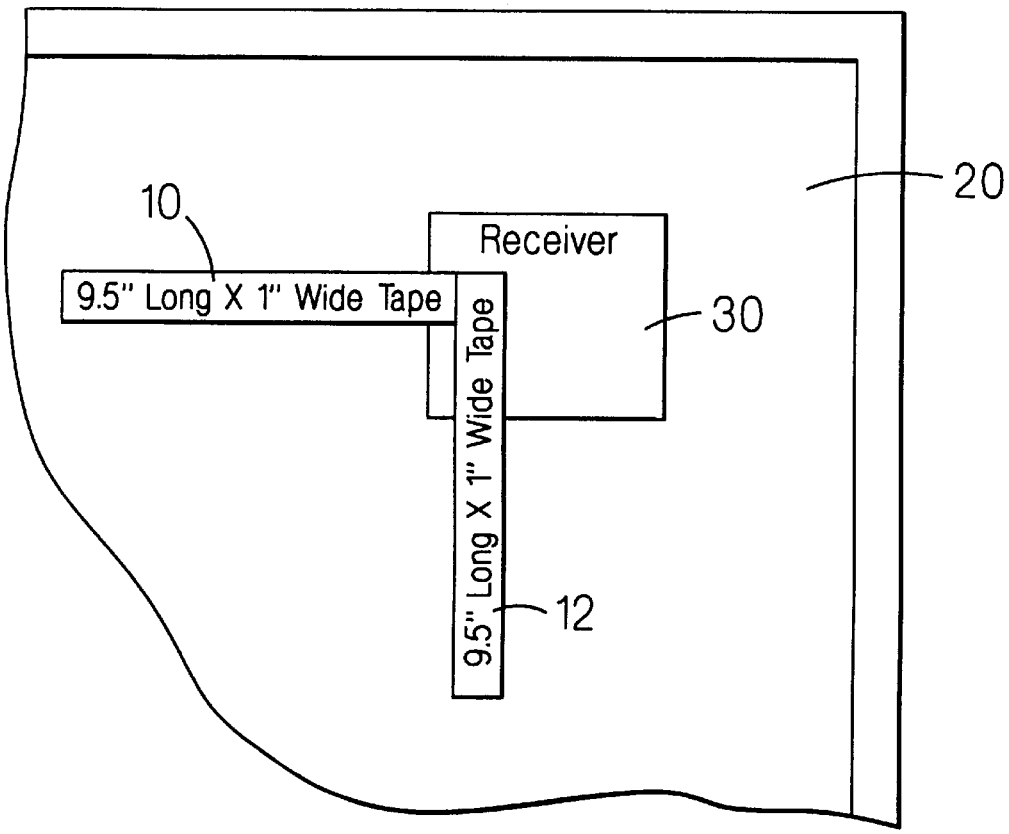
FIG. 1 is top plan view of one embodiment of the present invention mounted in a non-metallic housing.

Reference should now be made to the drawing figures on which FIG. 1 illustrates one embodiment of the present invention which includes two metallic strips 10 and 12, orthogonally disposed, and having their proximal ends overlapping. Strips 10 and 12 are preferably of aluminum and conveniently may be commercially available, adhesive-backed aluminum tape of the type used to seal joints in heating and ventilating systems. In the example shown, strips 10 and 12 are adhesively attached to the inner surface of a plastic housing, or electronic tub, 20. An RF control receiver 30 is mounted in housing 20, with the distal end of horizontal strip 10 extending approximately one inch under the receiver and the distal end of vertical strip 12 extending approximately three inches under the receiver.

Figure 2:
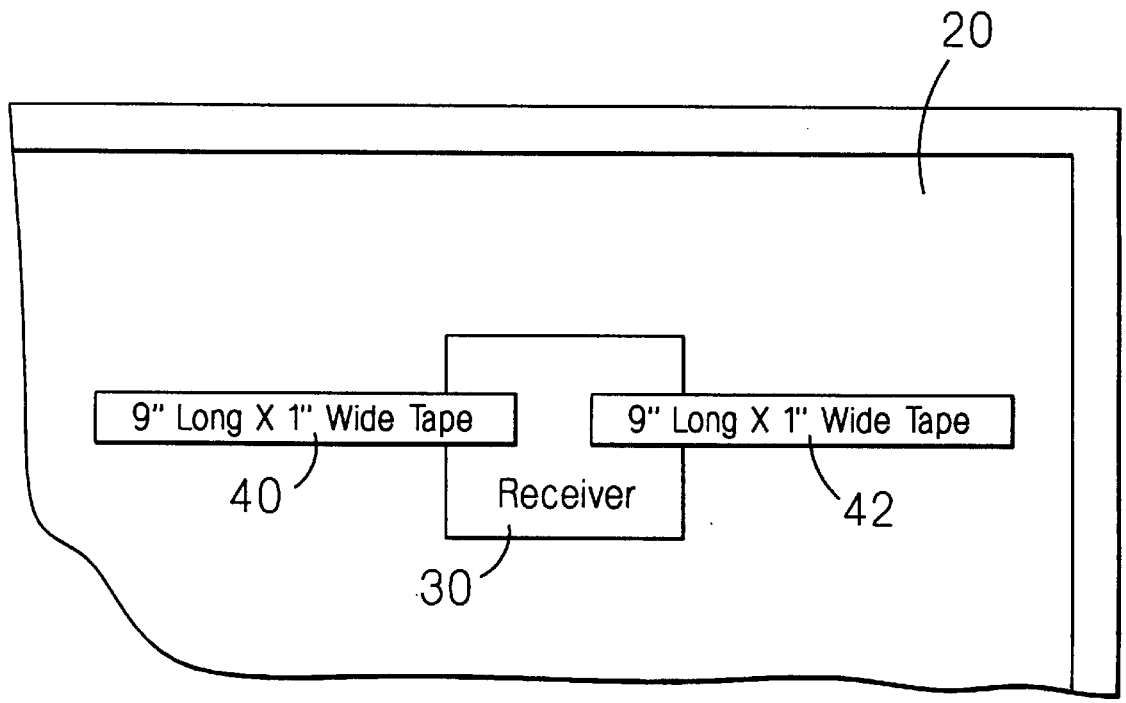
FIG. 2 is a top plan view of another embodiment of the present invention mounted in a non-metallic housing.

FIG. 2 illustrates another embodiment of the present invention which includes two metallic strips 40 and 42 both extending horizontally from RF receiver 30, with the proximal ends of the strips not overlapping, and with approximately one inch of each of the proximal ends of the strips extending under the RF receiver. As was the case with strips 10 and 12, above, the strips are adhesively attached to the inner surface of housing 20, with RF receiver 30 mounted on top of the strips.

Metallic strips 10, 12, 40, and 42 may also be adhesively attached to non-metallic mounting brackets for RF receiver 30. Strips 10, 12, 40, and 42 are placed near the RF receiver at locations where the RF transmission is air coupled to the receiver from the strips and are of a length determined by the operating frequency. That length for each is preferably ¼ wavelength of the system frequency, thus forming a ½ wavelength dipole with two strips. Many remote keyless entry systems operate at a frequency of 315 MHz, making the length of each strip 10, 12, 40, and 42 approximately nine inches, using the formula: L=5904/f/2, where L is the electrical quarter wavelength in inches, and f is the frequency in megahertz. The number 5904 is determined by taking the velocity of electromagnetic propagation in inches per second, dividing that velocity by 2 to convert to one-half wavelength, and dividing by one million to convert to megaherz.

Figure 3:
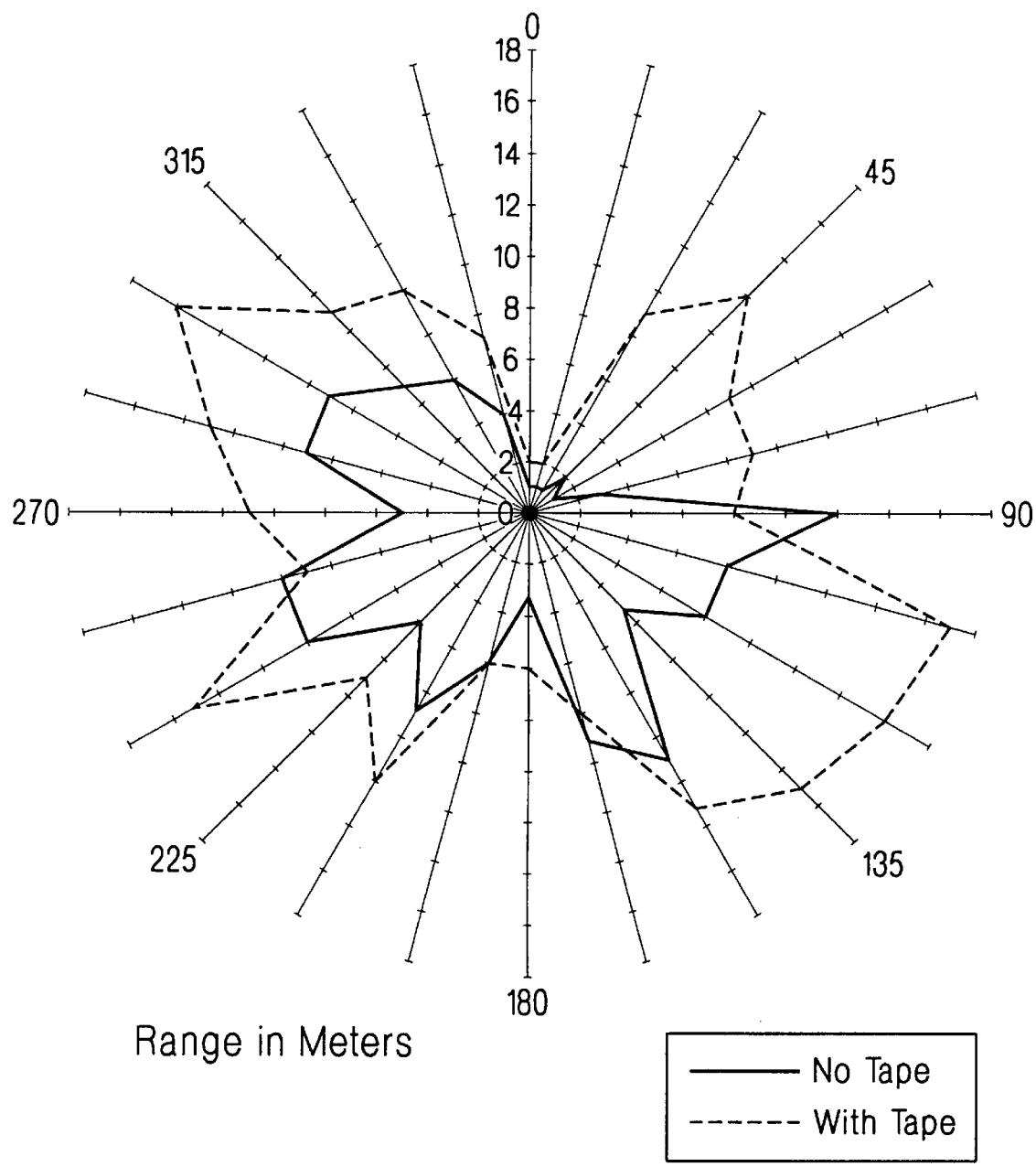
FIGS. 3–5 are graphs, using plane polar coordinates, of extended receiver range achieved by the above embodiments, compared with normal receiver range.
Figure 4:
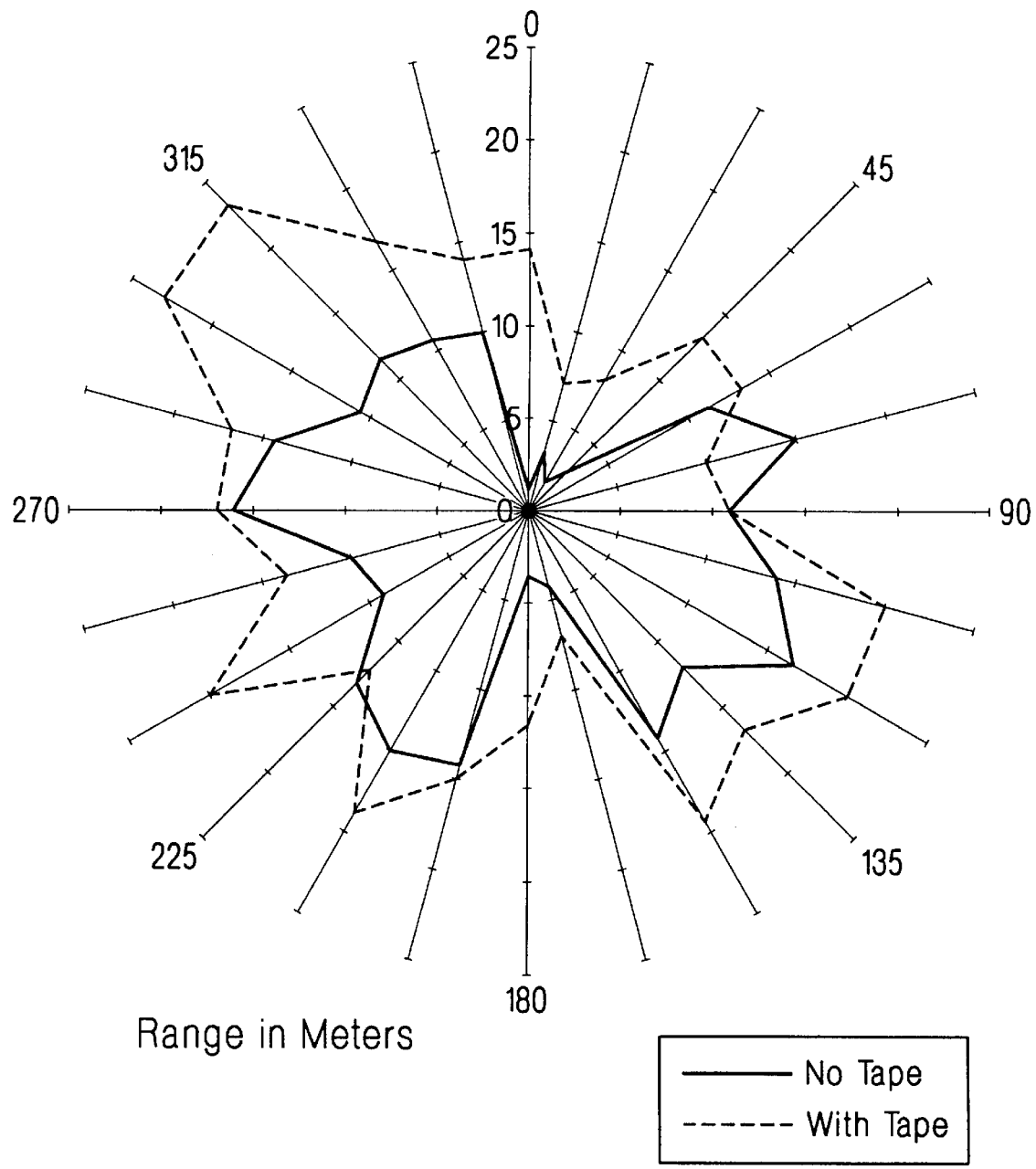
Figure 5:
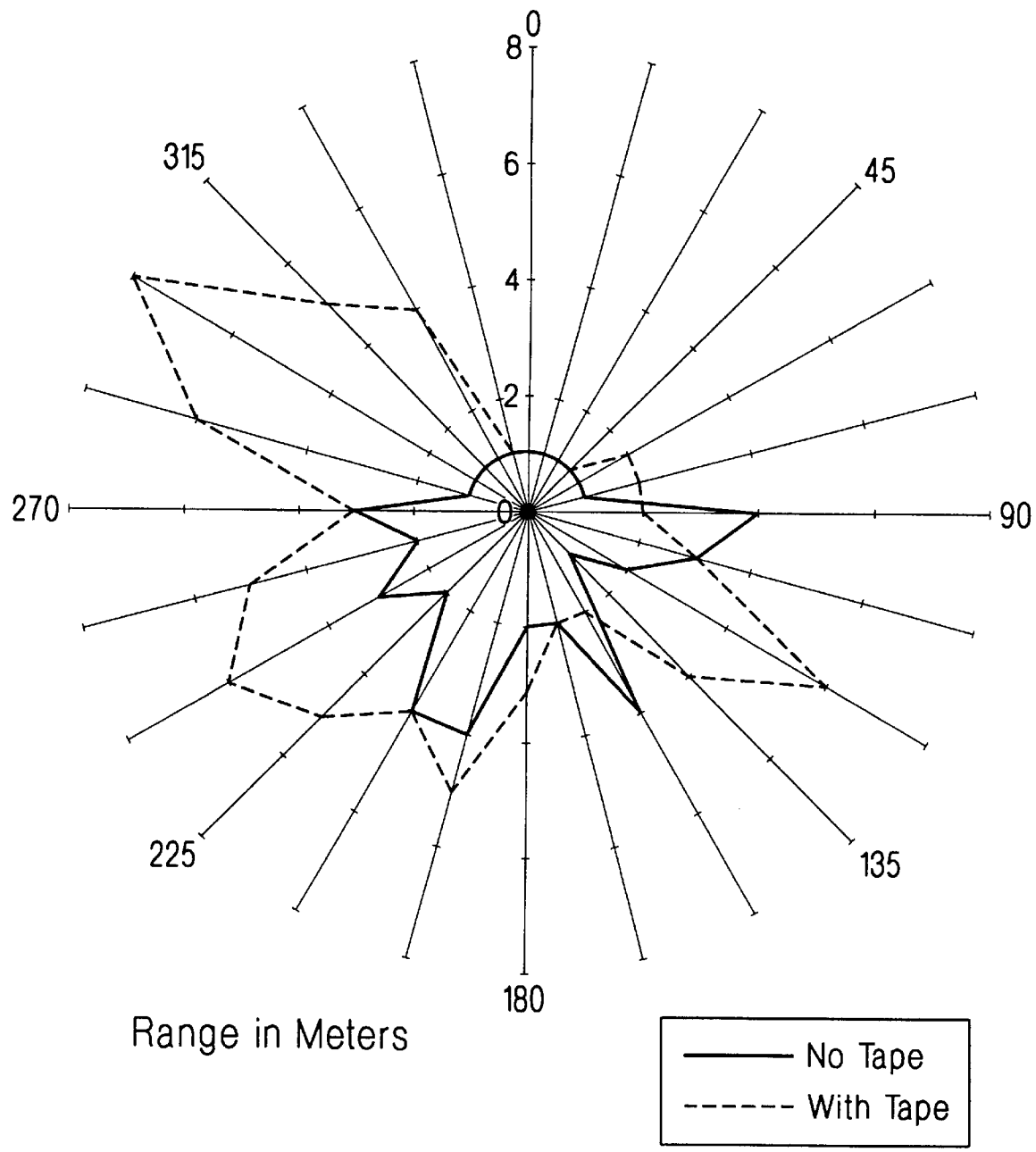

For testing purposes, a width of one and one-quarter inches was chosen, with strips 10 and 12 being cut to lengths of nine and one-half inches and strips 40 and 42 being cut to lengths of nine inches. The improvements in range were the same for each embodiment and are shown on FIGS. 3–5 which present actual measurements of range around vehicles. Different receivers were used for FIGS. 3 and 4 and a lower power transmitter was used for FIG. 5. FIG. 6 presents the receiver sensitivities and transmitter powers used for the measurements, as well as the numerical data obtained therefrom. As can be seen from each of these figures, a significant improvement in range was achieved.

It will be understood that the present invention is easily retrofitted to existing RF receiver installations. All that is required is removing the RF receiver, applying the strips to an element of the non-metallic housing, and reinstalling the RF receiver.

While the foregoing describes embodiments of the present invention which were found to be quite satisfactory, use of only one metallic strip can also provide improved receiver range. Other orientations are also within the contemplation of the present invention. Whether one or two or more metallic strips are employed, they should be oriented in a manner that captures the most signal and couples it into the RF receiver.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. Apparatus for extending the receiving range of an RF receiver mounted in a non-metallic housing, comprising:

two orthogonally disposed metallic strips attached to an element of said non-metallic housing disposed so as to receive an RF signal transmitted to said RF receiver and air couple said RF signal into said RF receiver, said two metallic strips having overlapping proximal ends in proximity to said RF receiver.

2. Apparatus for extending the receiving range of an RF receiver mounted in a non-metallic housing, comprising:

two metallic strips attached to an element of said non-metallic housing disposed so as to receive an RF signal transmitted to said RF receiver and air couple said RF signal into said RF receiver, said two metallic strips having spaced apart proximal ends in proximity to said RF receiver.

3. Apparatus, as defined in claim 2, wherein: each of said two metallic strips has a length of approximately one-quarter wavelength of said RF signal.

4. Apparatus, as defined in claim 1, wherein: each of said two metallic strips has a length of approximately one-quarter wavelength of said RF signal.

5. Vehicle mounted apparatus for receiving a transmitted RF signal, comprising:

a non-metallic housing mounted within a vehicle;

an RF receiver adapted to receive said transmitted RF signal, and being mounted on an inner surface of said non-metallic housing; and a metallic strip attached to said inner surface of said non-metallic housing so as to receive said transmitted RF signal and air couple said transmitted RF signal into said RF receiver.

6. Vehicle mounted apparatus, as defined in claim 5, wherein one end of said metallic strip extends between a portion of said RF receiver and said inner surface of said non-metallic housing.

7. Vehicle mounted apparatus, as defined in claim 5, wherein said metallic strip has a length of approximately one-quarter wavelength of said transmitted RF signal.

* * * * *